(12) United States Patent
Lamarre et al.

(10) Patent No.: US 12,221,927 B2
(45) Date of Patent: Feb. 11, 2025

(54) FLAMMABLE FLUID RESERVOIR

(71) Applicant: PRATT & WHITNEY CANADA CORP., Longueuil (CA)

(72) Inventors: Sylvain Lamarre, Boucherville (CA); Kashif Mohammed, Brossard (CA); John Sgouromitis, Dorval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/304,575

(22) Filed: Apr. 21, 2023

(65) Prior Publication Data

US 2024/0352893 A1  Oct. 24, 2024

(51) Int. Cl.

| F02C 7/25 | (2006.01) |
|---|---|
| B64D 27/10 | (2006.01) |
| F01D 25/18 | (2006.01) |
| F02C 7/14 | (2006.01) |
| F02C 7/18 | (2006.01) |
| F02C 7/22 | (2006.01) |
| F02C 7/232 | (2006.01) |
| F02C 7/36 | (2006.01) |
| F02C 9/26 | (2006.01) |

(52) U.S. Cl.
CPC ............. *F02C 7/25* (2013.01); *B64D 27/10* (2013.01); *F01D 25/18* (2013.01); *F02C 7/14* (2013.01); *F02C 7/185* (2013.01); *F02C 7/22* (2013.01); *F02C 7/222* (2013.01); *F02C 7/232* (2013.01); *F02C 7/36* (2013.01); *F02C 9/263* (2013.01)

(58) Field of Classification Search
CPC .......... F01D 25/18; F01D 25/20; F01D 25/22; F02C 9/263; F02C 7/14; F02C 7/185; F02C 7/22; F02C 7/222; F02C 7/232; F02C 7/25
See application file for complete search history.

(56) References Cited

U.S. PATENT DOCUMENTS

| 3,032,986 A | * | 5/1962 | Wright | F02C 9/28 60/39.091 |
|---|---|---|---|---|
| 3,344,602 A | * | 10/1967 | David | F02C 7/232 60/39.094 |
| 4,203,566 A | | 5/1980 | Lord | |

(Continued)

FOREIGN PATENT DOCUMENTS

RU  2545261  6/2015

*Primary Examiner* — Kyle Robert Thomas
(74) *Attorney, Agent, or Firm* — Norton Rose Fulbright Canada LLP

(57) ABSTRACT

An aircraft engine reservoir system includes a reservoir inner chamber containing a flammable fluid. A chamber inlet is fluidly connectable to a flammable fluid source pressurizing the fluid. The chamber includes an outlet. An air source operates at a pressure that is lower that a flammable fluid pressure during an engine operational condition. A valve selectively fluidly connecting the chamber to the air source is movable between a closed position, in which the chamber flammable fluid pressure acting on the valve exceeds the air source pressure acting on the valve such that the valve blocks the air from entering the chamber, and an open position, in which the chamber flammable fluid pressure acting on the valve is lower than the air source pressure acting on the valve such that the valve allows the air to flow into the chamber and evacuate the flammable fluid from the chamber through the outlet.

20 Claims, 6 Drawing Sheets

(56) References Cited

U.S. PATENT DOCUMENTS

| | | | |
|---|---|---|---|
| 4,770,201 A * | 9/1988 | Zakai | F16K 7/18 137/202 |
| 5,168,709 A | 12/1992 | Bombard | |
| 7,040,576 B2 | 5/2006 | Noiseux et al. | |
| 8,434,692 B2 | 5/2013 | Scott | |
| 8,485,222 B2 | 7/2013 | Restivo et al. | |
| 8,701,307 B2 | 4/2014 | Slack et al. | |
| 8,833,053 B2 | 9/2014 | Chir | |
| 9,267,390 B2 | 2/2016 | Lo | |
| 9,903,274 B2 | 2/2018 | Diaz | |
| 10,563,936 B2 | 2/2020 | Tajiri | |
| 10,590,799 B2 | 3/2020 | Zebian | |
| 10,739,086 B2 | 8/2020 | Aouizerate | |
| 11,060,462 B2 | 7/2021 | Fert et al. | |
| 2007/0245739 A1 | 10/2007 | Stretton | |
| 2009/0175718 A1 | 7/2009 | Diaz | |
| 2011/0030337 A1 | 2/2011 | Mons | |
| 2012/0168115 A1 | 7/2012 | Raimarckers et al. | |
| 2014/0145008 A1 | 5/2014 | Webster | |
| 2018/0135467 A1 | 5/2018 | Zhang et al. | |
| 2019/0072035 A1 | 3/2019 | Peace et al. | |
| 2019/0145317 A1 | 5/2019 | Holt | |

* cited by examiner

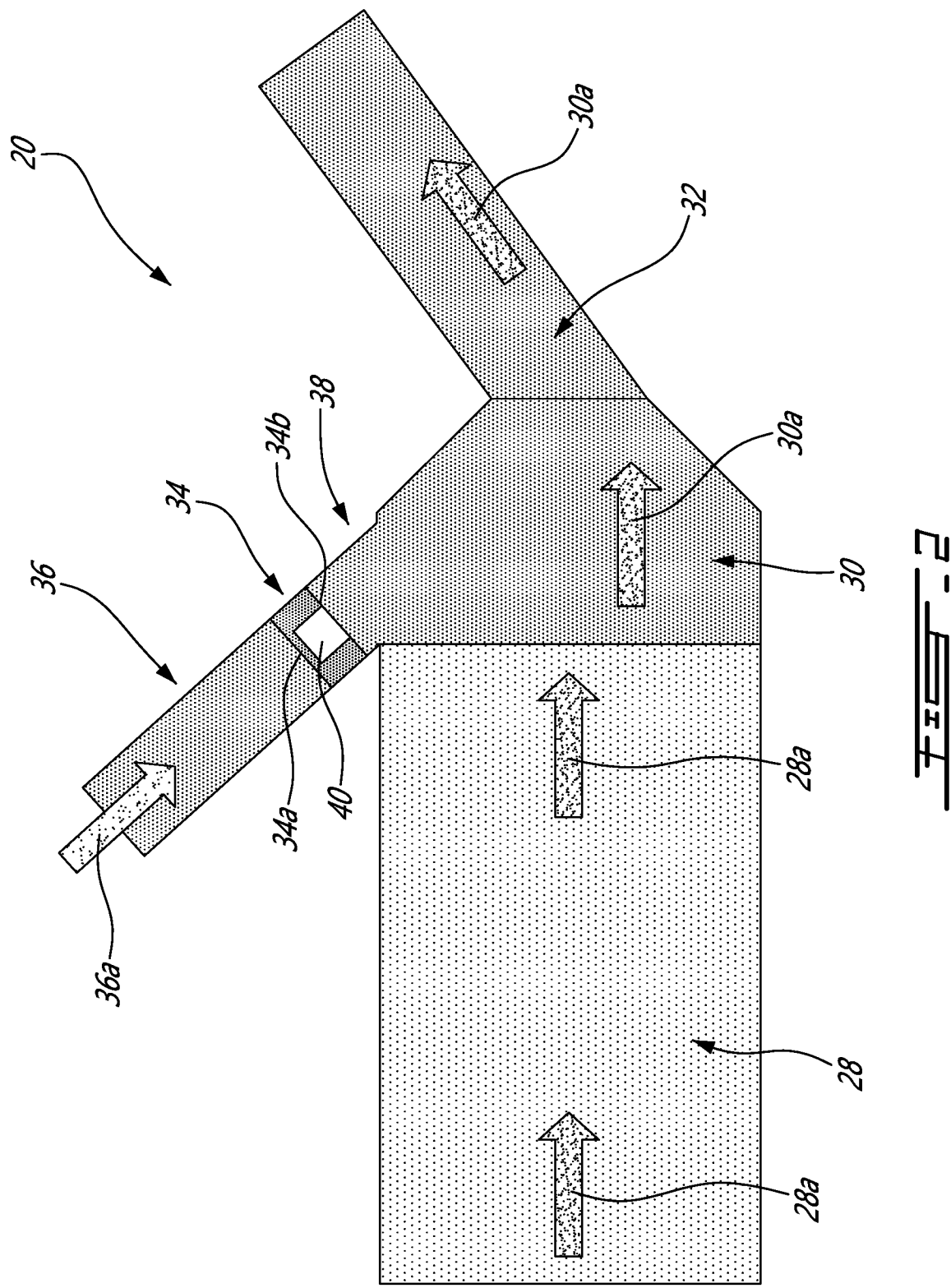

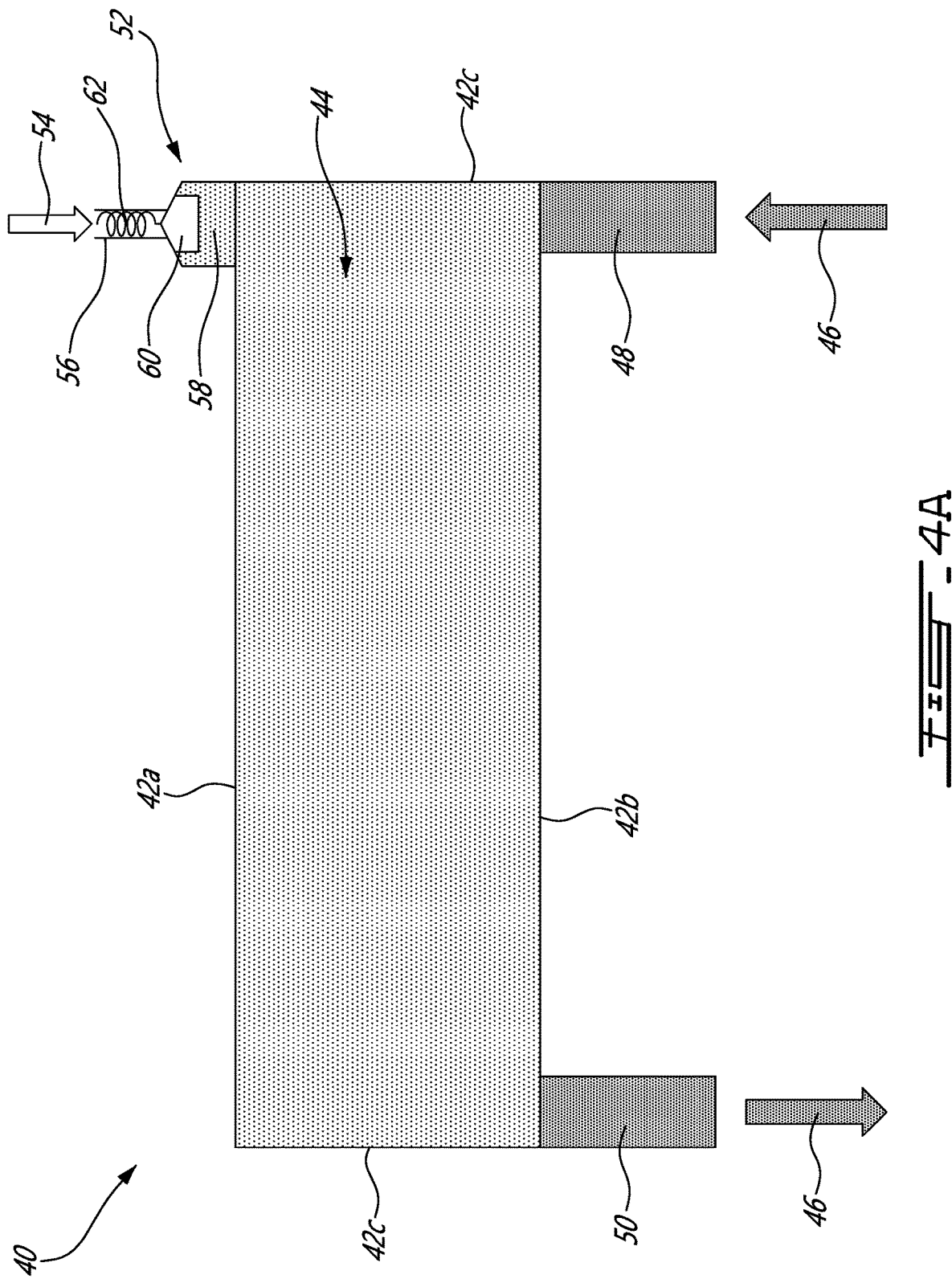

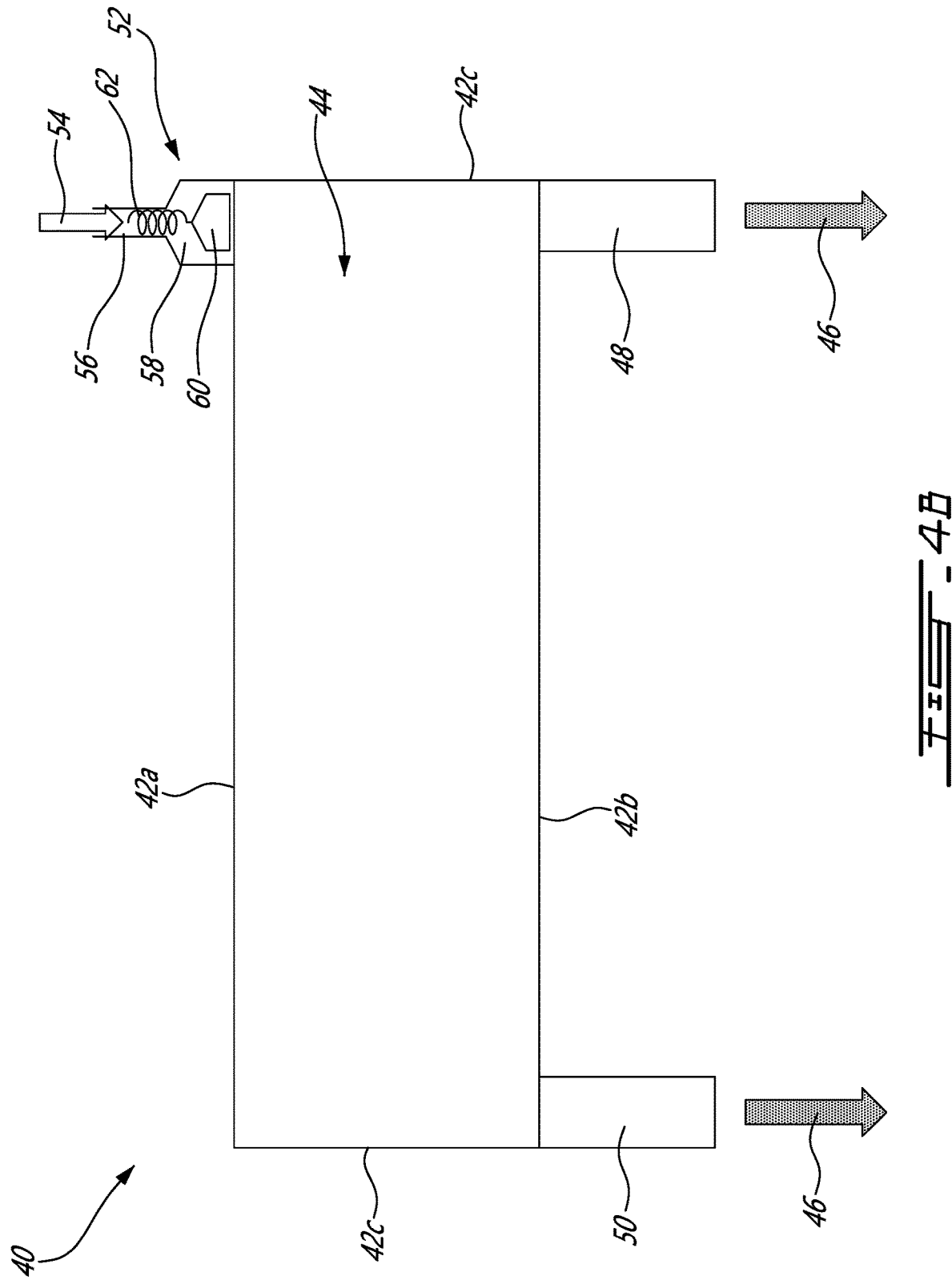

FLAMMABLE FLUID RESERVOIR

TECHNICAL FIELD

The disclosure relates generally to fire mitigation and, more particularly, to flammable fluid-containing reservoirs.

BACKGROUND

Aircraft engines include reservoirs for containing flammable fluids such as oil and fuel. These reservoirs, for instance heat exchangers or accumulators, must respect various fire safety ratings. In some cases, these reservoirs may remain full of fluid upon engine shutdown, for instance due to hydraulic lock caused by anti-siphoning features. In such cases, the reservoir may require additional fire-proofing hardware to prevent combustion of the fluid in case of fire.

SUMMARY

In one aspect, there is provided a reservoir system for an aircraft engine, comprising: an inner chamber of a reservoir that contains a flammable fluid; an inlet to the inner chamber, the inlet fluidly connectable to a source of the flammable fluid which pressurizes the flammable fluid to a pressure during an operational condition of the aircraft engine; an outlet from the inner chamber; an air source that operates at a pressure that is lower that the pressure of the flammable fluid during the operational condition of the aircraft engine; and a valve selectively fluidly connecting the inner chamber to the air source, the valve being movable between a closed position, in which the pressure of the flammable fluid in the inner chamber acting on the valve exceeds the pressure of air from the air source acting on the valve such that the valve blocks the air from entering the inner chamber, and an open position, in which the pressure of the flammable fluid in the inner chamber acting on the valve is lower than the pressure of the air from the air source acting on the valve such that the valve allows the air to flow into the inner chamber and evacuate the flammable fluid from the inner chamber through the outlet.

In another aspect, there is provided an aircraft engine, comprising: a source of a flammable fluid which pressurizes the flammable fluid to a pressure during an operational condition of the aircraft engine; an air source that operates at a pressure that is lower that the pressure of the flammable fluid during the operational condition of the aircraft engine; and a reservoir containing the flammable fluid, the reservoir including; a wall circumscribing an inner chamber containing the flammable fluid; an inlet to the inner chamber, the inlet fluidly connected to the source of the flammable fluid and flowing the flammable fluid into the inner chamber; an outlet from the inner chamber, the outlet flowing the flammable fluid out of the inner chamber; and a valve selectively fluidly connecting the inner chamber to the air source, the valve being movable between a closed position in which the valve blocks air from the air source from entering the inner chamber during an operational state of the aircraft engine in which the pressure of the flammable fluid in the inner chamber acting on the valve exceeds the pressure of air from the air source acting on the valve, and an open position in which the valve allows the air to flow into the inner chamber and evacuate the flammable fluid from the inner chamber through the outlet during a shutdown state of the aircraft engine in which the pressure of the flammable fluid in the inner chamber acting on the valve is lower than the pressure of the air from the air source acting on the valve.

In a further aspect, there is provided a method for evacuating a flammable fluid from a reservoir of an aircraft engine, comprising: flowing a flow of the flammable fluid into the reservoir via an inlet and out of the reservoir via an outlet, the flow of the flammable fluid maintaining a valve to the reservoir in a closed position in which the valve blocks air from an air source from entering the reservoir; and ceasing the flow of the flammable fluid into the reservoir via the inlet, the ceasing of the flow of the flammable fluid allowing the valve to the reservoir to movie into an open position in which the valve allows the air to flow into the reservoir and evacuate the flammable fluid from the reservoir through the outlet.

BRIEF DESCRIPTION OF THE DRAWINGS

Reference is now made to the accompanying figures in which:

FIG. 2 is a schematic cross sectional view of an exhaust section of the engine of FIG. 1;

FIG. 4A is a schematic cross sectional view of another flammable fluid-containing reservoir for the engine of FIG. 1 in a first engine operational mode; and FIG. 4B is a schematic cross sectional view of the flammable fluid-containing reservoir of FIG. 4A in a second engine operational mode.

DETAILED DESCRIPTION

Figure 1:
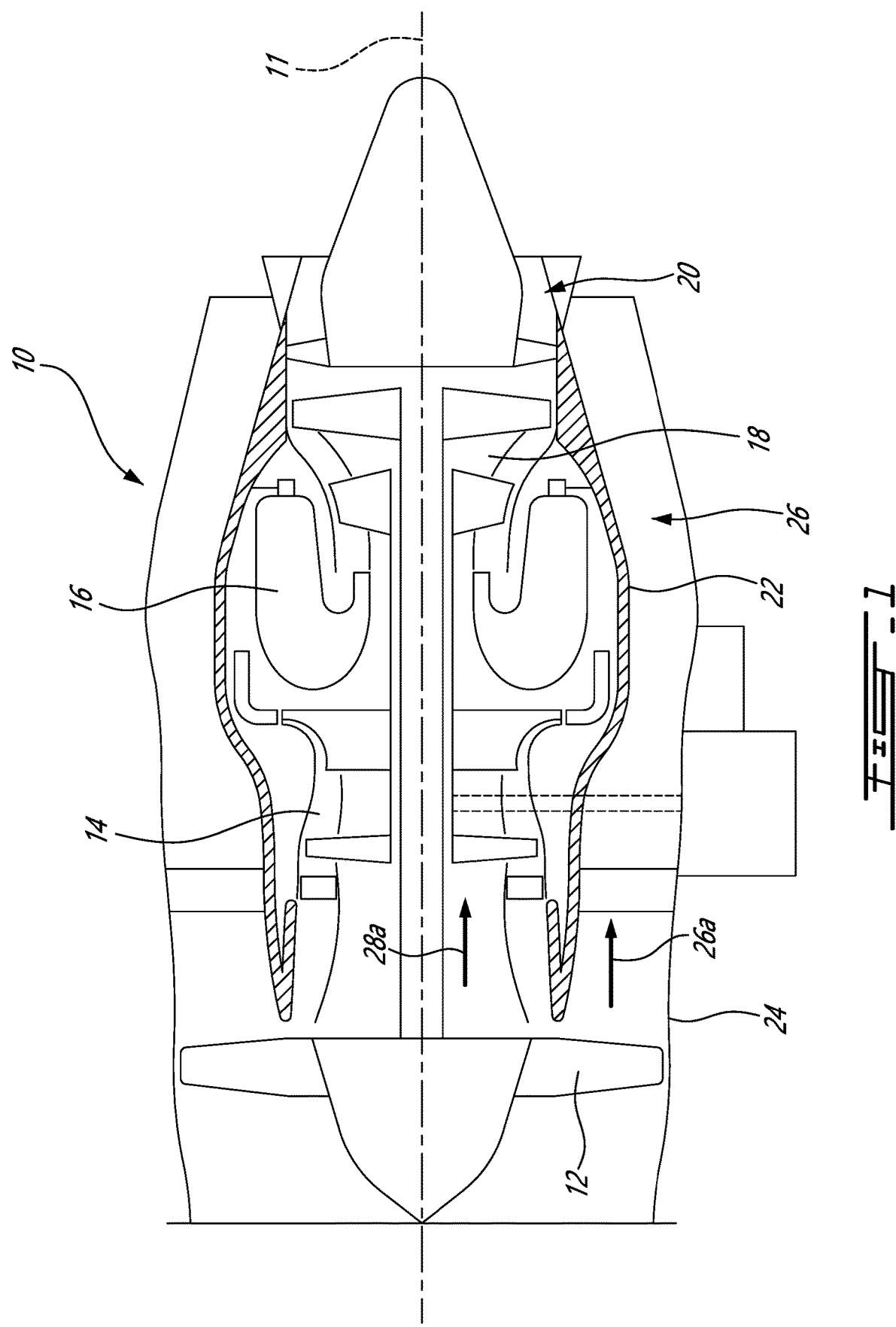
FIG. 1 is a schematic cross sectional view of a gas turbine engine.

FIG. 1 illustrates a gas turbine engine 10 of a type preferably provided for use in subsonic flight, generally comprising in serial flow communication, along central longitudinal axis 11, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Engine 10 further includes an exhaust section 20 where hot combustion gases are expelled. While FIG. 1 depicts engine 10 as a turbofan-type gas turbine engine, the present disclosure may relate to other types of aircraft engines, such as turboprop engines, turboshaft engines, as well as hybrid-electric engines.

The gas turbine engine 10 includes a first, inner casing 22 which encloses the turbo machinery of the engine 10, and a second, outer casing 24 extending outwardly of the first casing 22 such as to define an annular bypass passage 26 therebetween, also referred to as a bypass duct or an annular outer passage. The air propelled by the fan 12 is split into a first portion which flows around the first casing 22 within the bypass passage 26, and a second portion which flows through a main gas path 28, also referred to as a core passage, which is defined within the first casing 22 and allows the gas flow to circulate through the multistage compressor 14, combustor 16 and turbine section 18 as described above. A core gas flow 28a is said to flow through the main gas path 28 (also referred to as the core gas path), while a bypass gas flow 26a is said to flow through the bypass passage 26.

Referring additionally to FIG. 2, at the exhaust section 20, the core gas flow 28a and the bypass gas flow 26a are exhausted from the engine 10 through an exhaust duct 30 and an external exhaust 32. In the depicted embodiment, engine 10 further includes a reservoir 40 (see FIG. 3) containing a flammable fluid. Illustratively, reservoir 40 forms part of an air-cooled oil cooler 34, disposed adjacent the exhaust duct 30 and in fluid communication therewith, in which warm engine oil (i.e., the flammable fluid) contained in the reservoir 40 is operable to transfer heat to the cool air flowing through the air-cooled oil cooler 34. Other types of reservoirs 40 containing flammable fluids may be contemplated, for instance various types of heat exchangers or accumulators containing flammable fluids such as oil or fuel.

In the depicted embodiment, the air-cooled oil cooler 34 receives cooling airflow 36a via an air inlet duct 36 for cooling the oil in the air-cooled oil cooler 34, and exhausts the cooling airflow 36a into the exhaust duct 30 via an air outlet duct 38. The air-cooled heat exchanger 34 includes an inlet 34a receiving the cooling airflow 36a from the inlet duct 36 and an outlet 34b for expelling the cooling airflow 36b through the outlet duct 38 towards the exhaust duct 30. The inlet duct 36 and outlet duct 38 may collectively be referred to as a heat exchanger duct. The cross-sectional shape of the heat exchanger duct may vary, for instance circular, square or rectangular.

Figure 3A:
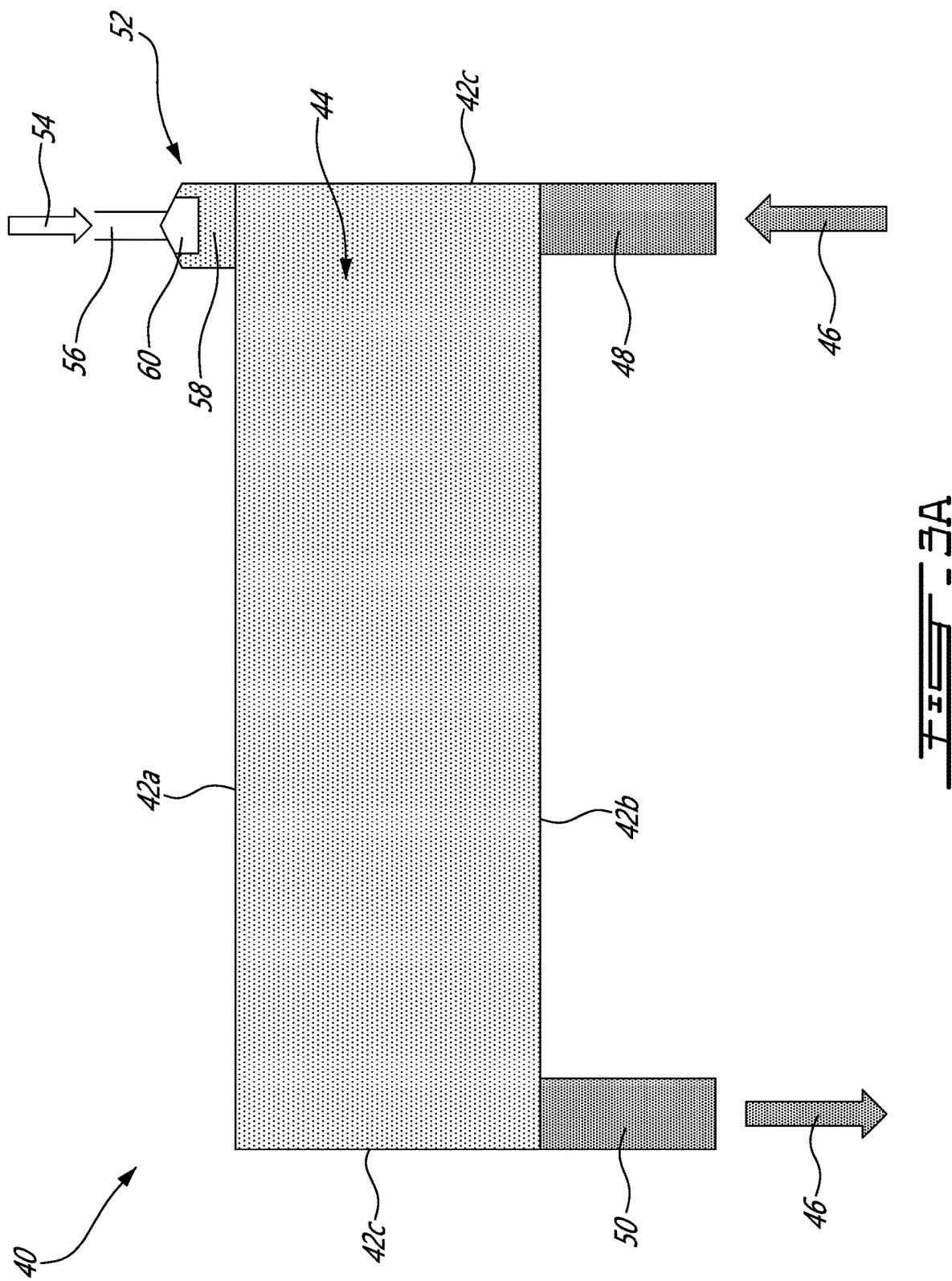
FIG. 3A is a schematic cross sectional view of a flammable fluid-containing reservoir for the engine of FIG. 1 in a first engine operational mode.
Figure 3B:
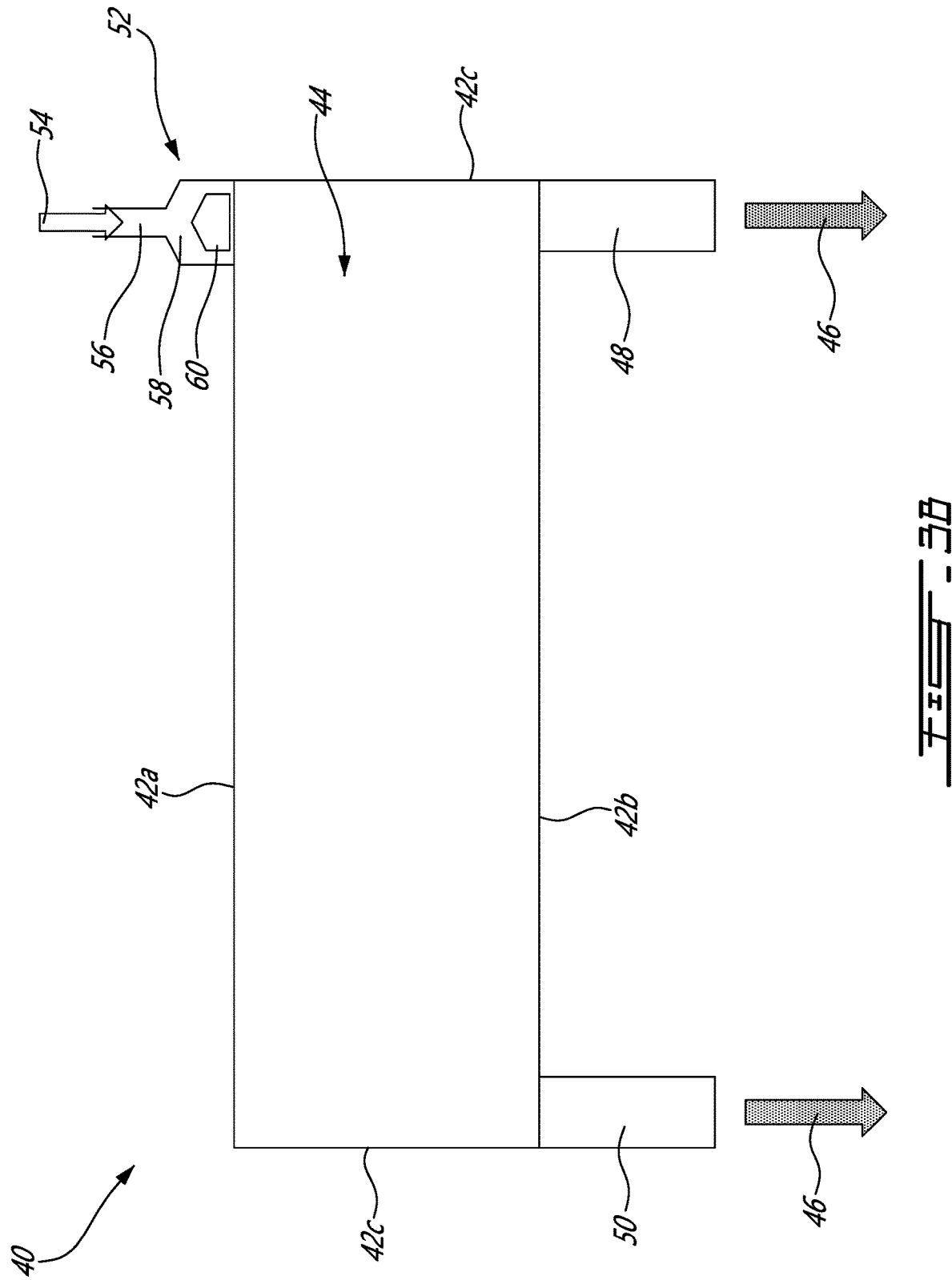
FIG. 3B is a schematic cross sectional view of the flammable fluid-containing reservoir of FIG. 3A in a second engine operational mode.

Referring additionally to FIGS. 3A-3B, an embodiment of a reservoir 40 operable for containing a flammable fluid 46 for the engine 10 is shown. As discussed above, the reservoir 40 may form part of an air-cooled oil cooler 34 as in FIG. 2. Other types of reservoirs 40 containing flammable fluids may be contemplated, for instance various types of heat exchangers or accumulators containing flammable fluids such as oil or fuel. The depicted reservoir 40 includes a wall 42 circumscribing an inner chamber 44 operable to contain the flammable fluid 46. In the shown case, the inner chamber 44 has a rectangular cross-section and is defined by upper wall portion 42a, lower wall portion 42b and side wall portions 42c. Other shapes for the reservoir 40 and the inner chamber 44 may be contemplated. The reservoir 40 includes an inlet 48 and an outlet 50. The inlet 48 provides or flows the flammable fluid 46 into the inner chamber 44, while the outlet 50 flows, withdraws or evacuates the flammable fluid 46 from the inner chamber 44. In some cases, the inlet 48 and/or the outlet 50 may be fluidly coupled to a source of the flammable fluid 46 within the engine 10, or another engine component that receives or makes use of the flammable fluid 46. In the shown case, the inlet 48 and the outlet 50 are disposed at the lower wall 42b of the inner chamber 44, although other locations for the inlet 48 and/or the outlet 50 may be contemplated.

Existing flammable fluid-containing reservoirs in gas turbine engines may be provided with one or more anti-siphoning features to ensure the system is always primed. However, this may lead to hydraulic locking at engine shutdown. Stated differently, air may be prevented from entering the inner chamber via its inlet, outlet, or via other means. If the reservoir relies on gravity-based draining to empty its contents upon engine shutdown, the hydraulic locking due to the presence of such anti-siphoning features (i.e., the absence of air in the inner chamber, inlet and outlet) may at least partially prevent such gravity-based draining from occurring. Stated differently, at least some of the flammable fluid contained in the inner chamber may remain in place, which may pose a fire safety risk. As such, existing flammable fluid-containing reservoirs may require additional fire proofing measures and/or may be constructed out of fireproof materials, which may increase the weight, cost and/or complexity of the engine.

Referring to FIGS. 3A and 3B, the reservoir 40 further includes a valve 52 to the inner chamber 44. The valve 52 is fluidly coupled to an air source and is selectively movable between a closed position (FIG. 3A, for instance while the engine 10 is operational) in which the valve 52 blocks air 54 from the air source from entering the inner chamber 44, and a closed positon (FIG. 3B, for instance while the engine is shut down) in which the valve allows air 54 from the air source into the inner chamber 44 to evacuate the flammable fluid 46 from the inner chamber 44, for instance via the outlet 50 and optionally the inlet 48. In the shown case, the valve 52 is disposed at the upper wall 42, although other locations for the valve 52 may be contemplated.

In the shown case, the valve 52 includes an air inlet 56, an air outlet 58, and a stopper 60. The air inlet 56 is fluidly coupled to the air source, the air outlet 58 is fluidly coupled the inner chamber 44, and the stopper 60 is operable to fluidly couple or uncouple (i.e., block or unblock) the air inlet 56 and the air outlet 58. The air source (not shown) may be a cavity or other engine component that may provide air to the valve 52 and is equipped to receive any flammable fluid that may escape the reservoir 40. For instance, in cases where the flammable fluid 46 is oil, the air source may be a gearbox, oil tank, or scavenge tube for the engine 10. Other air sources may be contemplated. In some cases, a drain tube may be provided adjacent the reservoir 40 so that any oil that may inadvertently splash or leak out of the reservoir from valve 52 may be recuperated.

The depicted stopper 60 is a float-type stopper 60 that may be buoyant in the flammable fluid 46. As shown in FIG. 3A, as the flammable fluid 46 enters and exits the inner chamber 44 via the inlet 48 and outlet 50, the fluid pressure of the flammable fluid 46 acting against the stopper 60 forces the stopper 60 to rise in the air outlet 48 and seal the valve 52, thereby preventing air 54 from entering the inner chamber 44. In such cases, the fluid pressure of the flammable fluid 46 acting against the stopper 60 via the air outlet 58 is greater than the air pressure acting against the stopper 60 via the air inlet 56. As shown in FIG. 3B, once the flammable fluid 46 is no longer actively flowing into the inner chamber 44 (for instance, when the engine 10 is shut down and the reservoir 40 is no longer serving its intended purpose, e.g. as a vessel in a heat exchanger), the fluid pressure of the flammable fluid 46 in the inner chamber 44 decreases. As such, the fluid pressure of the flammable fluid 46 acting against the stopper 60 via the air outlet 58 is inferior to the air pressure of the air 54 acting against the stopper 60 via the air inlet 56. The stopper 60, no longer buoyed by the fluid pressure of the flammable fluid 46, may therefore displace into the air outlet 58 (illustratively downwards towards the inner chamber 44), thereby allowing air 54 to flow through the valve 52 and into the inner chamber 44. The air 54 may evacuate the flammable fluid 46 from the previously hydraulically locked inner chamber 44 via the outlet 50 and/or the inlet 48. Other stoppers 60 may be contemplated, as will be discussed in further detail below.

Referring to FIGS. 4A-4B, another embodiment of a reservoir 40 is shown, with like reference numerals referring to like elements. In the shown embodiment, the valve 52 includes a spring 62 operatively coupled to the stopper 60. The spring 62 may be compressible and extendible between a first or closed position (shown in FIG. 4A) and a second or open position (shown in FIG. 4B). In the closed position, for instance while the engine 10 is in an operating condition (as shown in FIG. 4A), as the flammable fluid 46 enters and exits the inner chamber 44 via, respectively, the inlet 48 and outlet 50, the fluid pressure of the flammable fluid 46 acting against the stopper 60 forces the stopper 60 to rise in the air outlet 58 and seal the valve 52, thereby preventing air 54 from entering the inner chamber 44. In such cases, the fluid pressure of the flammable fluid 46 acting against the stopper 60 via the air outlet 58 is greater than force of the spring 62 acting against the stopper 60, thereby causing the spring 62 to compress and the stopper 60 to seal or close the valve 52. In the open position (as shown in FIG. 4B), once the flammable fluid 46 is no longer actively flowing into the inner chamber 44 (for instance, when the engine 10 is shut down and the reservoir 40 is no longer serving its intended purpose), the fluid pressure of the flammable fluid 46 in the inner chamber 44 decreases. As such, the fluid pressure of the flammable fluid 46 acting against the stopper 60 via the air outlet 58 is inferior to the force of the spring 62 acting against the stopper 60. The spring 62 may therefore expand or extend and allow the stopper 60 to displace into the air outlet 58 (illustratively downwards towards the inner chamber 44), thereby allowing air 54 to flow through the valve 52 and into the inner chamber 44. The air 54 may evacuate the flammable fluid 46 from the previously hydraulically locked inner chamber 44 via the outlet 50 and/or the inlet 48.

The valves 52 shown in FIGS. 3A-4B may be referred to as passive valves, as they are operable to open and close based on the fluid and optionally the air pressure of the flammable fluid 46 and the air 54, respectively. Other types of valves 52, for instance active valves that are displaceable by motors, solenoids, or other means may also be contemplated. The location of the valve 52 may also vary. For instance, the valve 52 may be positioned in a side wall 42c of the inner chamber 44.

In accordance with the present disclosure, an exemplary method is shown for evacuating a flammable fluid 46 from a reservoir 40 of an aircraft engine 10. A flow of the flammable fluid 46 is flowed into the reservoir 40 via an inlet 48 and out of the reservoir 40 via an outlet 50, the flow of the flammable fluid 46 maintaining a valve 52 to the reservoir 40 in a closed position in which the valve 52 blocks air 54 from an air source from entering the inner reservoir 40. The flow of the flammable fluid 46 is ceased into the reservoir 40 via the inlet 48, the ceasing of the flow of the flammable fluid 46 allowing the valve 52 to the reservoir 40 to movie into an open position in which the valve 52 allows the air 54 to flow into the reservoir 40 and evacuate the flammable fluid 46 from the reservoir 40 through the outlet 50.

It can be appreciated from the foregoing that at least some embodiments have a flammable fluid-containing reservoir with a valve for introducing air to evacuate the flammable fluid from the reservoir upon engine shutdown, thereby allowing for the reservoir to meet fire safety ratings without requiring additional fire proofing shields or materials. A reservoir system may thus be said to include the reservoir 40 as described herein as well as the sources both flammable fluid and air provided thereto.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A reservoir system for a heat exchanger of an aircraft engine, comprising:
    a reservoir of the heat exchanger having an inner chamber that contains a flammable fluid;
    an inlet to the inner chamber, the inlet fluidly connected to a source of the flammable fluid which pressurizes the flammable fluid to a pressure during an operational condition of the aircraft engine;
    an outlet to the inner chamber;
    an air source that operates at a pressure that is lower than the pressure of the flammable fluid during the operational condition of the aircraft engine; and
    a valve selectively fluidly connecting the inner chamber to the air source, the valve being movable between a closed position, in which the pressure of the flammable fluid in the inner chamber acting on the valve exceeds the pressure of air from the air source acting on the valve such that the valve blocks the air from entering the inner chamber, and an open position, in which the pressure of the flammable fluid in the inner chamber acting on the valve is lower than the pressure of the air from the air source acting on the valve such that the valve allows the air to flow into the inner chamber and evacuate the flammable fluid from the inner chamber through the outlet.

2. The reservoir system as defined in claim 1, wherein the valve includes an air inlet in fluid communication with the air source, an air outlet in fluid communication with the inner chamber, and a stopper floatable by the flammable fluid to selectively fluidly couple and uncouple the air inlet and the air outlet.

3. The reservoir system as defined in claim 2, further comprising a spring operatively coupled to the stopper and operable to compress in the closed position of the valve and extend in the open position of the valve.

4. The reservoir system as defined in claim 1, wherein the inlet and the outlet are disposed in a lower portion of the inner chamber.

5. The reservoir system as defined in claim 1, wherein the valve is disposed in an upper portion of the inner chamber.

6. The reservoir system as defined in claim 1, wherein the valve includes a stopper that is buoyant in the flammable fluid.

7. The reservoir system as defined in claim 1, wherein the valve, in the open position, allows the air to flow into the inner chamber and evacuate the flammable fluid from the inner chamber both through the outlet and through the inlet.

8. An aircraft engine, comprising:
    a source of a flammable fluid which pressurizes the flammable fluid to a pressure during an operational condition of the aircraft engine;
    an air source that operates at a pressure that is lower that the pressure of the flammable fluid during the operational condition of the aircraft engine; and
    a heat exchanger comprising a reservoir, the reservoir containing the flammable fluid, the reservoir including;
        a wall circumscribing an inner chamber containing the flammable fluid;
        an inlet to the inner chamber, the inlet fluidly connected to the source of the flammable fluid and flowing the flammable fluid into the inner chamber;
        an outlet from the inner chamber, the outlet flowing the flammable fluid out of the inner chamber; and
        a valve selectively fluidly connecting the inner chamber to the air source, the valve being movable between a closed position in which the valve blocks air from the air source from entering the inner chamber during an operational state of the aircraft engine in which the pressure of the flammable fluid in the inner chamber acting on the valve exceeds the pressure of air from the air source acting on the valve, and an open position in which the valve allows the air to flow into the inner chamber and evacuate the flammable fluid from the inner chamber through the outlet during a shutdown state of the aircraft engine in which the pressure of the flammable fluid in the inner chamber acting on the valve is lower than the pressure of the air from the air source acting on the valve.

9. The aircraft engine as defined in claim 8, wherein the valve includes an air inlet in fluid communication with the air source, an air outlet in fluid communication with the inner chamber, and a stopper floatable by the flammable fluid to selectively fluidly couple and uncouple the air inlet and the air outlet.

10. The aircraft engine as defined in claim 9, further comprising a spring operatively coupled to the stopper and operable to compress in the closed position of the valve and extend in the open position of the valve.

11. The aircraft engine as defined in claim 8, wherein the inlet and the outlet are disposed in a lower portion of the wall.

12. The aircraft engine as defined in claim 8, wherein the valve is disposed in an upper portion of the wall.

13. The aircraft engine as defined in claim 8, wherein the valve includes a stopper that is buoyant in the flammable fluid.

14. The aircraft engine as defined in claim 8, wherein the heat exchanger comprising the reservoir is an air-cooled oil cooler.

15. The aircraft engine as defined in claim 8, wherein the valve, in the open position, allows the air to flow into the inner chamber and evacuate the flammable fluid from the inner chamber both through the outlet and through the inlet.

16. The aircraft engine as defined in claim 8, wherein the air source is one of a gearbox, an oil tank, or a scavenge tube of the aircraft engine.

17. A method for evacuating a flammable fluid from a reservoir of a heat exchanger of an aircraft engine, comprising:
flowing a flow of the flammable fluid into the reservoir via an inlet and out of the reservoir via an outlet, the flow of the flammable fluid maintaining a valve to the reservoir in a closed position in which the valve blocks air from an air source from entering the reservoir; and
ceasing the flow of the flammable fluid into the reservoir via the inlet, the ceasing of the flow of the flammable fluid allowing the valve to the reservoir to movie into an open position in which the valve allows the air to flow into the reservoir and evacuate the flammable fluid from the reservoir through the outlet.

18. The method as defined in claim 17, wherein flowing the flow of the flammable fluid into the reservoir further includes flowing a flow of oil into an oil reservoir in an air-cooled oil cooler for the aircraft engine.

19. The method as defined in claim 17, wherein flowing the flow of the flammable fluid into the reservoir further comprises the flow of the flammable fluid compressing a spring operatively coupled to a stopper disposed in the valve to block the air from entering the reservoir.

20. The method as defined in claim 17, wherein ceasing the flow of the flammable fluid into the reservoir via the inlet further includes evacuating the flammable fluid from the reservoir both through the outlet and through the inlet.

* * * * *